United States Patent
Inoue (10) Patent No.: US 9,503,004 B2
(45) Date of Patent: Nov. 22, 2016

(54) MOTOR DRIVING CIRCUIT

(71) Applicant: ROHM CO., LTD., Ukyo-Ku, Kyoto (JP)

(72) Inventor: Shigeyuki Inoue, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 92 days.

(21) Appl. No.: 14/535,660

(22) Filed: Nov. 7, 2014

(65) Prior Publication Data

US 2015/0123591 A1    May 7, 2015

(30) Foreign Application Priority Data

Nov. 7, 2013    (JP) ................... 2013-231481

(51) Int. Cl.
  *H02P 8/00*    (2006.01)
  *H02P 8/12*    (2006.01)
  *H02P 6/18*    (2016.01)

(52) U.S. Cl.
  CPC ............. *H02P 8/12* (2013.01); *H02P 6/182* (2013.01); *H02P 2203/09* (2013.01)

(58) Field of Classification Search
  CPC  H02P 6/182; H02P 8/14; G05B 2219/41326
  See application file for complete search history.

(56) References Cited

U.S. PATENT DOCUMENTS

2013/0221894 A1* 8/2013 Larsson ............. H02P 6/182
                                                       318/696

FOREIGN PATENT DOCUMENTS

| JP | 9-103096 A | 4/1997 |
| JP | 2000-184789 A | 6/2000 |
| JP | 2004-120957 A | 4/2004 |
| JP | 2004-180354 A | 6/2004 |

* cited by examiner

Primary Examiner — Karen Masih
(74) Attorney, Agent, or Firm — Cantor Colburn LLP (57) ABSTRACT

A logic circuit controls a bridge circuit connected to a coil of a stepping motor in synchronization with an input pulse, so as to control electric power supplied to the coil of the stepping motor. A back electromotive force detector detects the back electromotive force $V_{BEMF}$ across the coil L. A load angle estimation unit estimates the load angle $\phi$ based on the back electromotive force detected in the detection period set in the high-impedance period set for the coil L. A logic circuit is configured to adjust electric power supplied to the coil such that the estimated load angle $\phi$ approaches a predetermined target angle $\phi_{REF}$.

16 Claims, 11 Drawing Sheets

MOTOR DRIVING CIRCUIT

CROSS REFERENCE

The present invention claims priority under 35 U.S.C. §119 to Japanese Application No. 2013-231481 filed Nov. 7, 2013, the entire content of which is incorporated herein by reference.

BACKGROUND OF THE INVENTION

1. Field of the Invention

The present invention relates to a driving technique for a stepping motor.

2. Description of the Related Art

In many cases, various kinds of electronic devices such as digital still cameras, digital video cameras, disk apparatuses, printers, copiers, and the like employ stepping motors for various kinds of operations such as adjustment of the position of movable components such as lenses, pickup heads, print heads, etc., driving operations for driving a sheet feeder roller, and the like. Such a stepping motor is configured as a synchronous motor that rotates in synchronization with an input pulse applied by an external circuit. The stepping motor has high controllability for starting, stopping, and positioning. Furthermore, the stepping motor can be driven using an open loop control method. In addition, the stepping motor has an advantage of high compatibility with digital signal processing.

For example, related techniques have been disclosed in Japanese Patent Application Laid Open No. H09-103096, Japanese Patent Application Laid Open No. 2004-120957, Japanese Patent Application Laid Open No. 2000-184789, and Japanese Patent Application Laid Open No. 2004-180354.

In the normal state, the rotor of the stepping motor rotates synchronously in increments of a step angle in proportion to the number of input pulses. However, when a sudden change in the load or a sudden change in speed occurs, the stepping motor goes out of synchronization. Such a state will be referred to as "step-out". Once the stepping motor steps out, a special operation is required in order to restore the stepping motor to a normal driving state. Thus, there is a demand for a technique for preventing step-out.

In order to solve such a problem, in many cases, a motor driving circuit is designed such that a margin is applied to the assumed maximum load, thereby providing an output torque giving consideration to a margin for preventing step-out. However, such an arrangement has a disadvantage of large power loss. As another method, if a sensor is used to detect the position of the rotor, it leads to an increased cost due to an increased number of components.

SUMMARY OF THE INVENTION

The present invention has been made in order to solve such a problem. Accordingly, it is an exemplary purpose of an embodiment of the present invention to provide a driving circuit which is capable of driving a stepping motor with high efficiency while preventing step-out.

An embodiment of the present invention relates to a driving circuit for a stepping motor. The driving circuit comprises: a logic circuit that controls a bridge circuit connected to a coil of the stepping motor in synchronization with an input pulse, so as to control electric power supplied to the coil of the stepping motor; a back electromotive force detector that detects a back electromotive force across the coil; and a load angle estimation unit that estimates a load angle based on the back electromotive force detected in a detection period set in a high-impedance period set for the coil. The logic circuit is configured to adjust electric power supplied to the coil such that the estimated load angle approaches a predetermined target angle.

Such an embodiment allows a stepping motor to be driven with high efficiency while suppressing step-out.

The "detection period" may be set to an instantaneous time point, or may be set to a period of time from a given time point up to another given time point.

Also, the load angle estimation unit may comprise: an A/D converter that converts the back electromotive force into a digital value; a period counter that measures a period of the input pulse; and a calculator that multiplies the digital value by the period thus measured, so as to generate a load angle detection value that corresponds to the load angle. Also, the logic circuit may adjust electric power supplied to the coil such that the load angle detection value approaches a load angle target value that corresponds to the target angle.

Also, the logic circuit may comprise: a controller that generates an instruction value that corresponds to a difference between the load angle detection value and the load angle target value; a pulse modulator that generates a control pulse having a duty ratio that corresponds to the instruction value; and a pre-driver that controls the bridge circuit according to the control pulse.

The driving circuit according to an embodiment may further comprise a current detection circuit that generates a current detection value that indicates a current that flows through the coil of the stepping motor. Also, the logic circuit may comprise: a controller that generates a current value that corresponds to a difference between the load angle detection value and the load angle target value; a current control circuit that generates a control pulse having a duty ratio that is adjusted such that the current detection value does not exceed the current value; and a pre-driver that controls the bridge circuit according to the control pulse.

Also, the current control circuit may comprise: a comparator that compares the current detection value with the current value, and that generates a comparison signal which is asserted when the current detection value exceeds the current value; and a logic element that switches the control pulse to a first level when the comparison signal is asserted, and that switches the control pulse to a second level for every predetermined period.

Also, the controller may comprise a PI controller.

Also, the logic circuit may pulse-modulate the control pulse for driving the bridge circuit such that the load angle approaches the target angle.

Also, the logic circuit may adjust a power supply voltage supplied to the bridge circuit such that the load angle approaches the target angle.

Also, the detection period may be positioned at an approximately central region of the high-impedance period.

Also, the detection period may be positioned at a time point after an elapse of time obtained by multiplying a length of the high-impedance period by a predetermined coefficient after a transition to the high-impedance period. Also, the logic circuit or otherwise the back electromotive force detector may include a measuring unit that measures the length of the high-impedance period.

Also, the driving circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the driving circuit as a single IC, such an arrangement allows the circuit area to be reduced, and allows the circuit elements to have uniform characteristics.

Another embodiment of the present invention relates to an electronic device. The electronic device comprises: a stepping motor; and any one of the aforementioned motor driving circuits configured to drive the stepping motor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
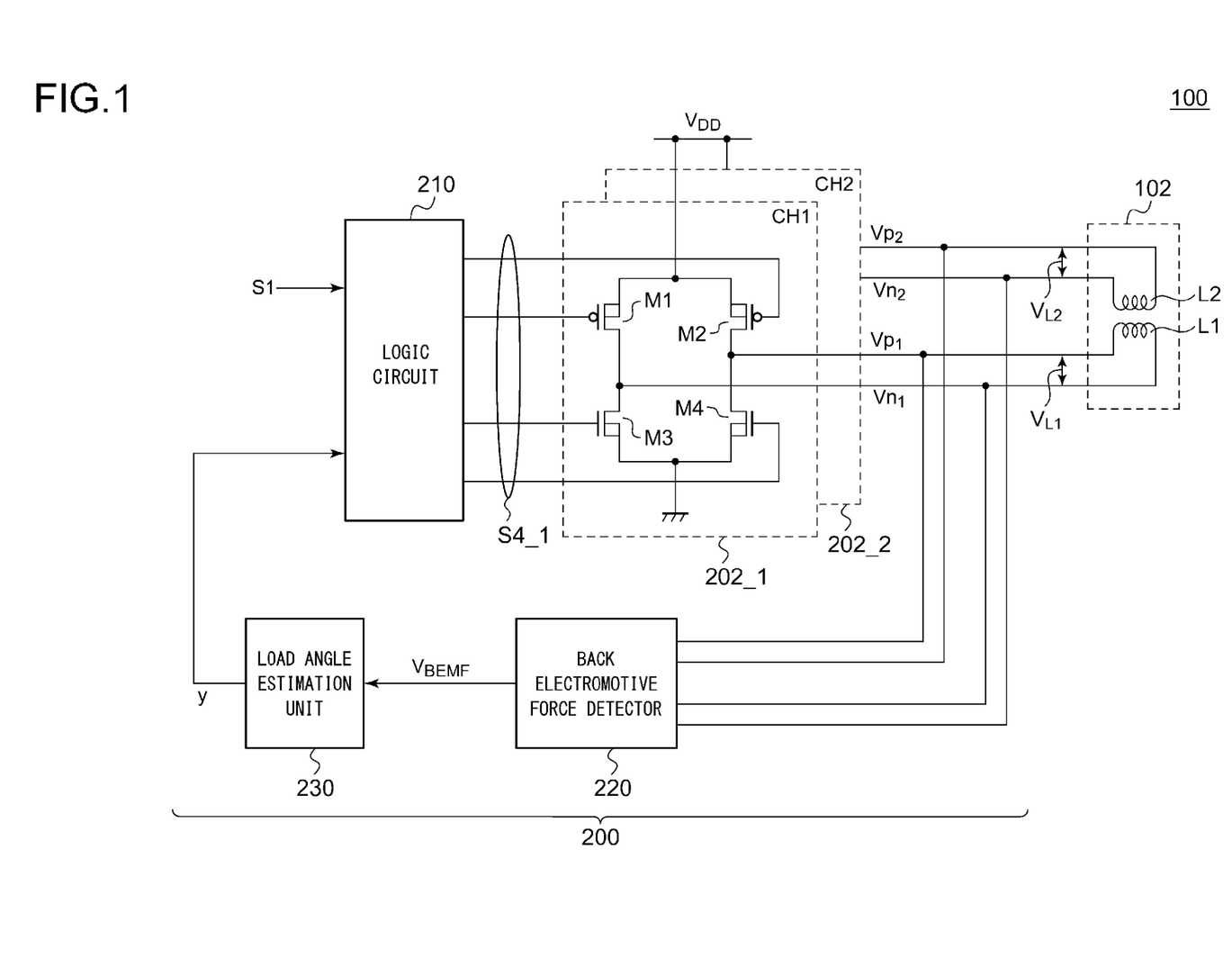
FIG. 1 is a block diagram showing a motor driving circuit according to an embodiment.

FIG. 1 is a block diagram showing a configuration of a motor driving circuit 200 according to an embodiment. The motor driving circuit 200 forms an actuator 100 together with a stepping motor 102. The kind of the stepping motor 102 is not restricted in particular. Any of a PM (permanent Magnet) stepping motor, a VR (Variable Reluctance) stepping motor, an HB (Hybrid) stepping motor, or the like may be employed as the stepping motor 102.

The motor driving circuit 200 receives an input pulse S1 from an external circuit, and rotates the stepping motor 102 by an angle that corresponds to the number of pulses of the input pulse S1. The motor driving circuit 200 includes bridge circuits 202_1 and 202_2, a logic circuit 210, a back electromotive force detector 220, and a load angle estimation unit 230, which are monolithically integrated on a single semiconductor substrate.

The stepping motor 102 includes coils L1 and L2 corresponding to two channels.

The bridge circuit 202_1 for the first channel CH1 is connected to the first coil L1 of the stepping motor 102. The bridge circuit 202_2 for the second channel CH2 is connected to the second coil L2 of the stepping motor 102.

The bridge circuits 202_1 and 202_2 are each configured as an H-bridge circuit including four transistors M1 through M4. The transistors M1 through M4 included in the H-bridge circuit 202_1 are switched on and off according to a driving signal S4_1 received from the logic circuit 210. This allows the voltage (which will also be referred to as the "first coil voltage") $V_{L1}$ across the first coil L1 to be switched on and off.

The bridge circuit 202_2 is configured in the same manner as the bridge circuit 202_1. The transistors M1 through M4 included in the bridge circuit 202_2 are switched on and off according to a driving signal S4_2 (not shown) received from the logic circuit 210. This allows the voltage (which will also be referred to as the "second coil voltage") $V_{L2}$ across the second coil L2 to be switched on and off.

The logic circuit 210 receives an input pulse S1 which indicates the rotational speed (synchronous speed) of the stepping motor 102. The logic circuit 210 controls the bridge circuits 202_1 and 202_2 in synchronization with the input pulse S1 so as to control the current (electric power) supplied to each of the first coil L1 and the second coil L2 of the stepping motor 102.

Specifically, the logic circuit 210 generates the driving signal S4_1 such that the phase (electric angle) of the coil current $I_{COIL1}$ changes with every predetermined edge of the input pulse S1 by 45 degrees for 1-2 phase excitation. In the present specification, a predetermined number of edges included in a unit of time will be referred to as the "pulse rate", which will be represented using units of pps (pulses per second). Such a predetermine edge at which the waveform of the coil current $I_{COIL1}$ is to be changed may be configured as a positive edge, a negative edge, or both.

As an example, the logic circuit 210 generates the driving signal S4_1 configured to repeat a sequence comprising a first driving period, a first high-impedance period, a second driving period, and a second high-impedance period.

(1) First Driving Period (Electric Angle of 0 to 135 Degrees)

The coil current $I_{COIL1}$ flows through the first coil L1 in the first direction ($I_{COIL1}$>0).

(2) First High Impedance Period Hi-z1 (Electric Angle of 135 to 180 Degrees)

Both ends of the first coil L1 are set to the high-impedance state.

(3) Second Driving Period (Electric Angle of 180 to 315 Degrees)

The coil current $I_{COIL1}$ flows through the first coil L1 in the second direction ($I_{COIL1}$<0).

(4) Second High Impedance Period Hi-z2 (Electric Angle of 315 to 360 Degrees)

Both ends of the first coil L1 are set to the high-impedance state.

For the second channel CH2, the current $I_{COIL2}$ that flows through the second coil L2 is controlled with a phase that is advanced or otherwise delayed by 90 degrees with respect to the current $I_{COIL1}$. The logic circuit 210 generates a driving signal S4_2 configured to repeat a sequence comprising a third driving period, a third high-impedance period, a fourth driving period, and a fourth high-impedance period.

(1) Third Driving Period (Electric Angle of 270 to 45 Degrees)

The coil current $I_{COIL2}$ flows through the second coil L2 in the second direction ($I_{COIL2}$<0).

(2) Third High Impedance Period Hi-z3 (Electric Angle of 45 to 90 Degrees)

Both ends of the second coil L2 are set to the high-impedance state.

(3) Fourth Driving Period (Electric Angle of 90 to 225 Degrees)

The coil current $I_{COIL2}$ flows through the second coil L2 in the first direction ($I_{COIL2}$>0).

(4) Fourth High Impedance Period Hi-z4 (Electric Angle of 225 to 270 Degrees)

Both ends of the second coil L2 are set to the high-impedance state.

The logic circuit 210 switches the state of each of the first channel CH1 and the second channel CH2 in synchronization with the input pulse S1. Furthermore, the logic circuit 210 generates a second pulse S2 which is pulse-modulated and has a higher frequency than that of the input pulse S1. The logic circuit 210 switches on and off the transistors M1 through M4 of the bridge circuit 202 with a high switching speed according to the control pulse S2.

Figure 2:
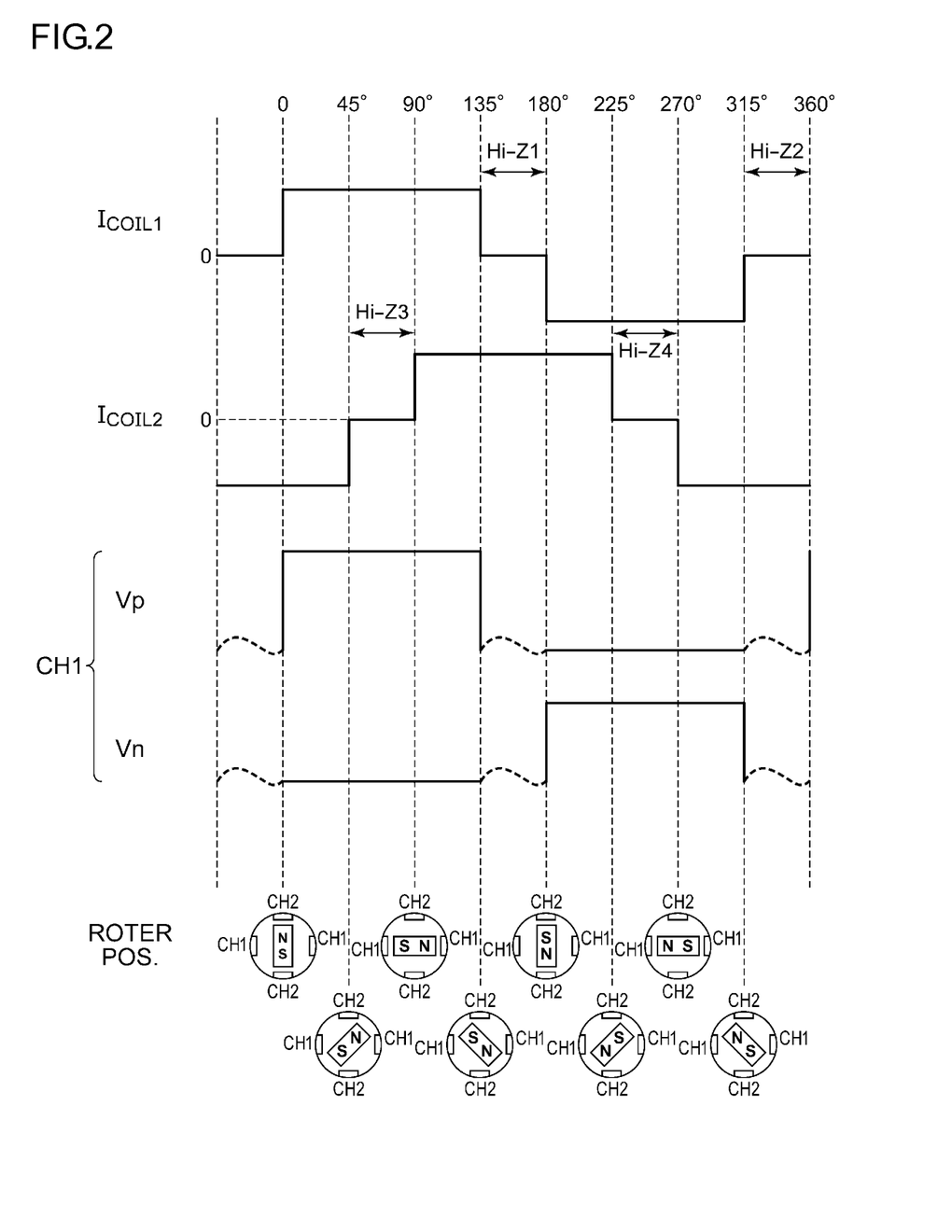
FIG. 2 is a waveform diagram showing an operation sequence of the motor driving circuit.

FIG. 2 is a waveform diagram showing an operation sequence of the motor driving circuit 200. FIG. 2 shows, in the following order beginning from the top, the current $I_{COIL1}$ that flows through the coil L1, the current $I_{COIL2}$ that flows through the coil L2, the voltage $Vp_1$ at one end of the coil L1, the voltage $Vn_1$ at the other end of the coil L1, and the position of the rotor of the stepping motor 102. The relative relation between the phase of the current and the position of the rotor changes depending on the load state and the pulse rate. FIG. 2 shows a case in which there is no delay of the rotor with respect to the coil current. The delay of the rotor becomes large according to the load and the pulse rate. When the delay of the rotor exceeds 90 degrees, there is a high probability of step-out.

The back electromotive force detector 220 detects the back electromotive force $V_{BEMF1\_1}$ and $V_{BEMF1\_2}$ of the first coil L1 in the first and second high impedance periods Hi-z1 and Hi-z2. Furthermore, the back electromotive force detector 220 detects the back electromotive force $V_{BEMF2\_1}$ and $V_{BEMF2\_2}$ of the second coil L2 in the third and fourth high impedance periods Hi-z3 and Hi-z4.

Figure 3:
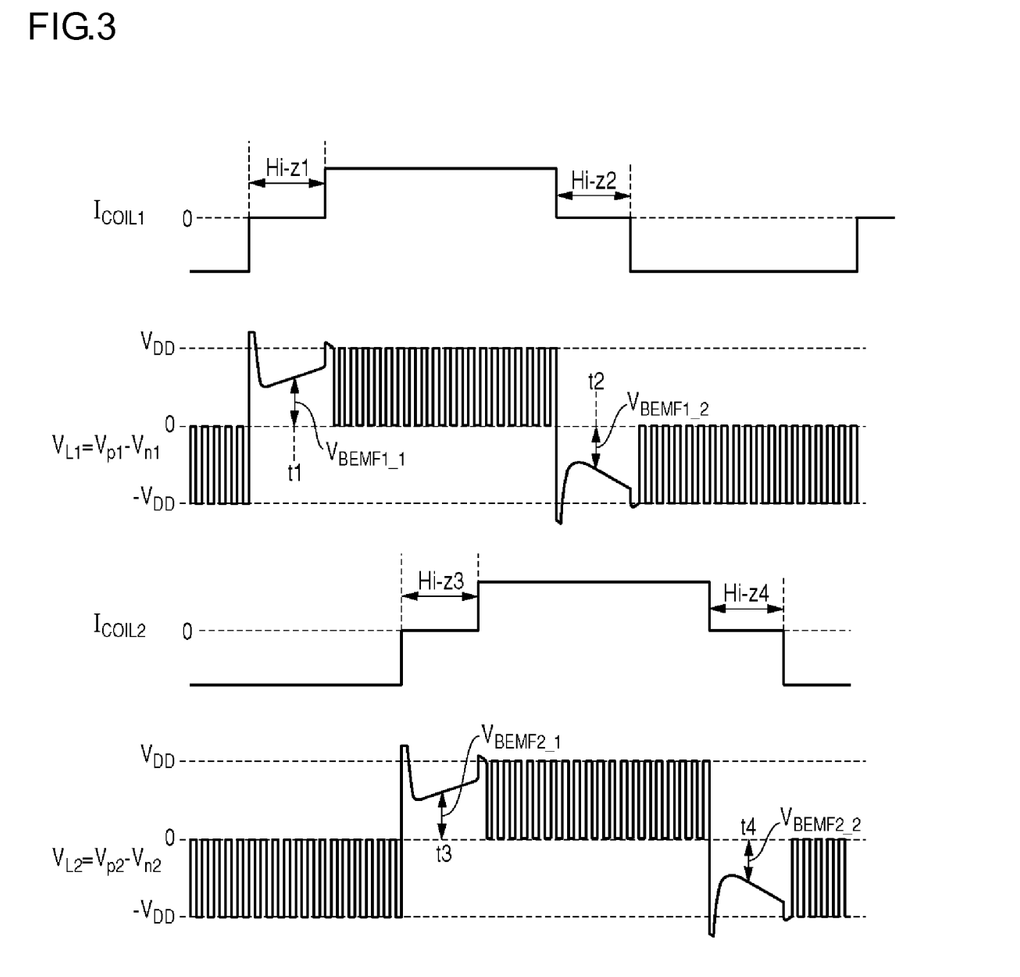
FIG. 3 is a diagram showing a detection operation of the motor driving circuit shown in FIG. 1 for detecting the back electromotive force $V_{BEMF}$.

FIG. 3 is a diagram showing a detection operation of the motor driving circuit 200 shown in FIG. 1 for detecting the back electromotive force $V_{BEMF}$. FIG. 3 shows, in the following order beginning from the top, the coil current $I_{COIL1}$, the first coil voltage $V_{L1}=vp_1-Vn_1$, the coil current $I_{COIL2}$, and the second coil voltage $V_{L2}=Vp_2-Vn_2$. Detection periods t1 through t4 are set in the respective high-impedance periods. The motor driving circuit 200 detects the back electromotive force $V_{BEMF1\_1}$, $V_{BEMF1\_2}$, $V_{BEMF2\_1}$, and $V_{BEMF2\_2}$, in the detection periods t1 through t4, respectively. Each detection period may be set as a central region of the corresponding high impedance period, for example.

Figure 4:
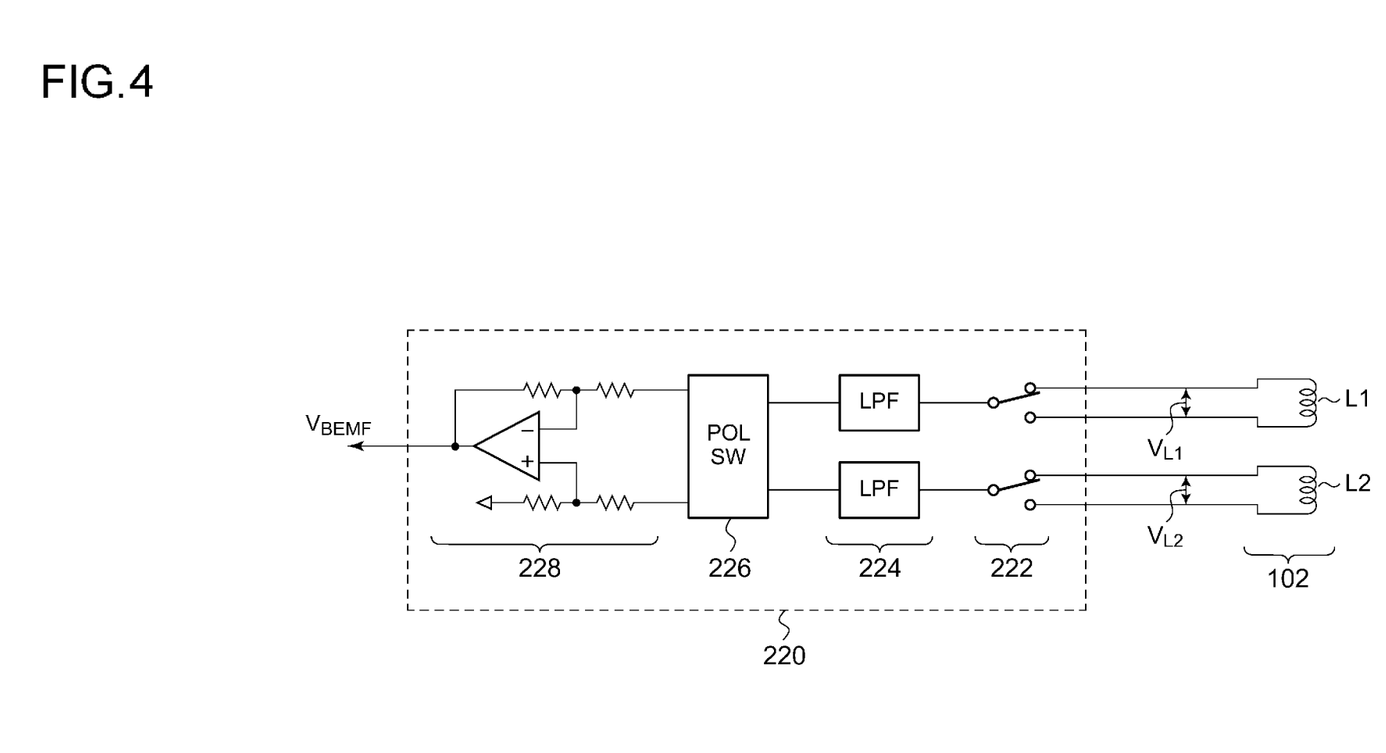
FIG. 4 is a circuit diagram showing an example configuration of a back electromotive force detector.

FIG. 4 is a circuit diagram showing an example configuration of the back electromotive force detector 220. It should be noted that the configuration of the back electromotive force detector 220 is not restricted to such an arrangement.

With the present embodiment, the single back electromotive force detector 220 is shared by the two channels. A channel selector 222 performs channel selection in synchronization with the rotation of the stepping motor 102. Specifically, the channel selector 222 selects the first coil L1 side in the first and second high-impedance periods Hi-z1 and Hi-z2, and selects the second coil L2 side in the third and fourth high-impedance periods Hi-z3 and Hi-z4.

In the first and second high-impedance periods Hi-z1 and Hi-z2, the back electromotive force detector 220 detects the back electromotive force $V_{BEMF1}=Vp_1-Vn_2$ of the first coil L1. In the third and fourth high-impedance periods Hi-z3 and Hi-z4, the back electromotive force detector 220 detects the back electromotive force $V_{BEMF2}=Vp_2-Vn_2$ of the second coil L2.

For example, the back electromotive force detector 220 includes a low-pass filter 224, a polarity selector switch 226, and a differential amplifier 228. The low-pass filter 224 divides each of the voltage pair Vp and Vn from the channel selector 222, and remove their noise components.

The polarity selector switch 226 performs polarity selection switching for the voltages Vp and Vn after they pass through the low-pass filter 224 such that the detected back electromotive force $V_{BEMF}$ has the same polarity at a load angle of zero (such that $V_{BEMF}$>0 holds true in the present embodiment). The function of the polarity selector switch 226 may be built into the channel selector 222.

The differential amplifier 228 amplifies the difference between the voltages $Vp_1/Vp_2$ and $Vn_1/Vn_2$ output from the polarity selector switch 226 so as to generate the back electromotive force $V_{BEMF1}/V_{BEMF2}$.

Returning to FIG. 1, description will be made.

The load angle estimation unit 230 estimates the load angle φ based on the back electromotive force $V_{BEMF}$ detected in the detection period set for the high-impedance period. The load angle φ corresponds to the difference between the position of the rotor (movable component) and the current vector (i.e., the specified position) determined by the driving current that flows through the first coil L1 and the second coil L2.

The detection period may be positioned after the elapse of a period obtained by multiplying, by a predetermined coefficient, the length of the high-impedance period measured by a measuring unit after the period transits to the high-impedance period. For example, such a predetermined coefficient may be ½, which sets the detection period to an approximately central region of the high-impedance period.

The motor driving circuit 200 may include a measuring unit that measures the length of the high-impedance period.

The measuring unit may be built into the logic circuit 210 or the back electromotive force detector 220. The length of the high-impedance period is proportional to the period of the input pulse S1. Thus, the measuring unit may measure the period of the input pulse S1.

The back electromotive force $V_{BEMF}$ in the detection period is represented by the following Expression.

$$V_{BEMF} = K_E \cdot \omega \cdot \cos\phi$$

Here, $K_E$ represents an inductive voltage constant, and $\omega$ represents the rotational speed. Thus, by measuring the back electromotive force $V_{BEMF}$, such an arrangement is capable of generating an estimated value having a correlation with the load angle $\phi$.

The logic circuit 210 is configured to adjust the electric power supplied to the coils L1 and L2 such that the estimated load angle $\phi$ approaches a predetermined target angle $\phi_{REF}$.

Figure 5:
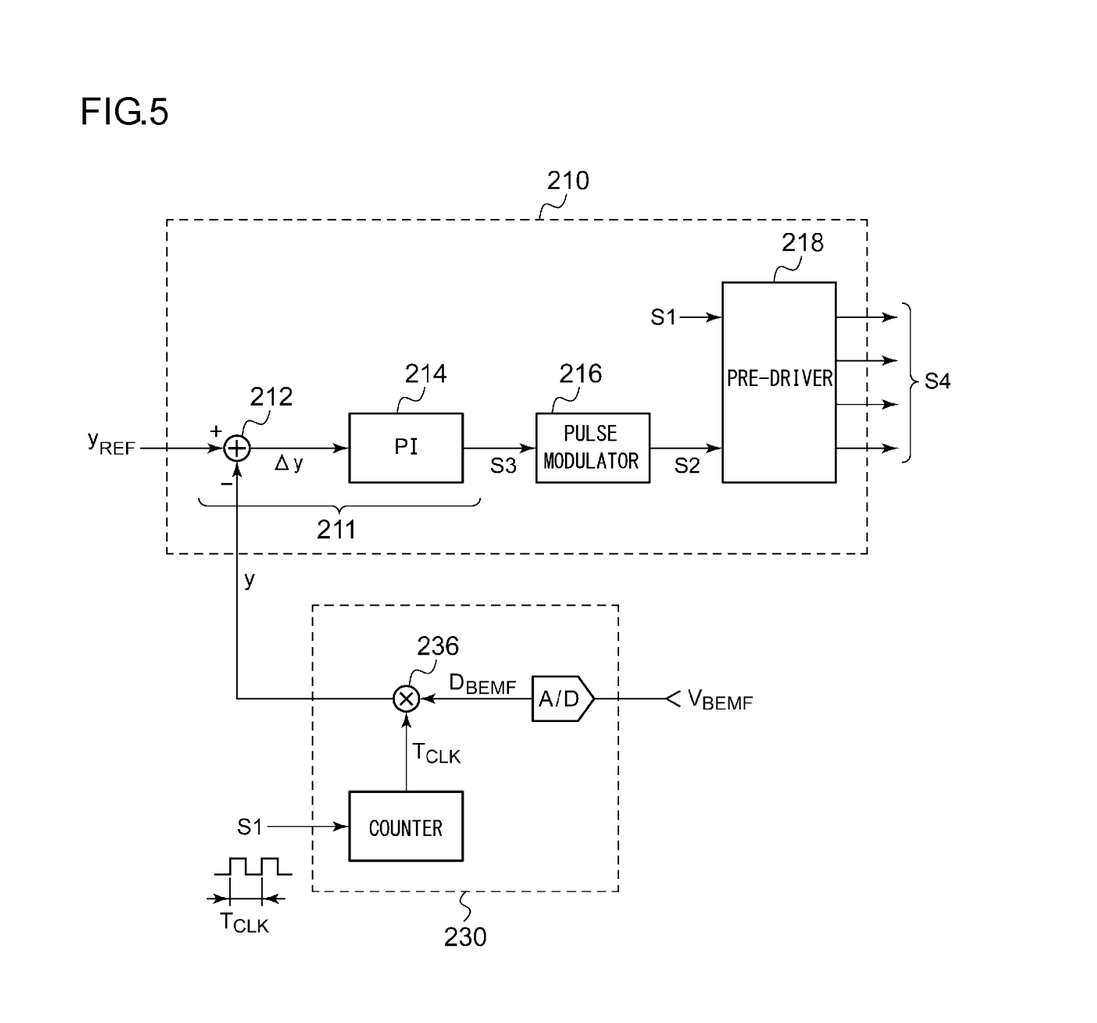
FIG. 5 is a block diagram showing an example configuration of a load angle estimation unit and a logic circuit.

FIG. 5 is a block diagram showing an example configuration of the load angle estimation unit 230 and the logic circuit 210.

The load angle estimation unit 230 includes an A/D converter 232, a period counter 234, and a calculator 236. The A/D converter 232 converts the back electromotive force $V_{BEMF}$ into a digital value. The period counter 234 measures the period $T_{CLK}$ of the input pulse S1. The calculator 236 multiplies the digital value $D_{BEMF}$ by the period $T_{CLK}$ measured by the period counter 234, so as to generate a load angle detection value y that corresponds to the load angle $\phi$.

$$y = D_{BEMF} \times T_{CLK} = K_E \cdot \omega \cdot \cos\phi \times T_{CLK} \quad (1)$$

Here, when the stepping motor 102 rotates in synchronization with the input pulse S1, its rotational speed $\omega$ is proportional to the frequency $f_{CLK}$ of the input pulse S1, and is inversely proportional to the period $T_{CLK}$ $$\omega = C \cdot f_{CLK} = C/T_{CLK} \quad (2)$$

Here, C represents a constant.

Thus, $T_{CLK}$ is represented by $T_{CLK} = C/\omega$. By substituting this Expression into Expression (1), the following Expression (3) is obtained.

$$y = K_E \cdot \omega \cdot \cos\phi \times C/\omega = K_E \cdot C \cdot \cos\phi \quad (3)$$

The logic circuit 210 adjusts the electric power supplied to the coil such that the load angle detection value y approaches the load angle target value $y_{REF}$ that corresponds to the target angle $\phi_{REF}$.

$$y_{REF} = K_E \cdot C \cdot \cos\phi_{REF} \quad (4)$$

The value of the target angle $\phi_{REF}$ may be set to a desired value by the user, and may preferably be set to a value which allows the stepping motor 102 to be driven with high efficiency.

The logic circuit 210 includes a controller 211, a pulse modulator 216, and a pre-driver 218.

The controller 211 generates an instruction value S3 that corresponds to the difference between the load angle detection value y and the load angle target value $y_{REF}$. For example, the controller 211 includes a subtractor 212 and a PI (proportional-integral) controller 214. The subtractor 212 calculates the difference $\Delta y$ between the load angle detection value y and the load angle target value $y_{REF}$. The PI controller 214 performs the PI control operation such that the difference $\Delta y$ becomes zero, so as to generate the instruction value S3. Instead of the PI controller 214, a P controller that performs a P (proportional) control operation or a PID controller that performs a PID (proportional-integral-differential) control operation may be employed. Also, such an operation of the controller 211 can be provided by an analog circuit employing an error amplifier.

The pulse generator 216 generates the control pulse S2 having a duty ratio that corresponds to the instruction value S3. The pulse modulator 216 may perform pulse width modulation, pulse frequency modulation, pulse density modulation, or the like, for example. The configuration of the pulse modulator 216 is not restricted in particular. Rather, the pulse modulator 216 may be configured using known techniques.

The pre-driver 218 controls the bridge circuit 202 according to the control pulse S2 and the input pulse S1.

Figure 6:
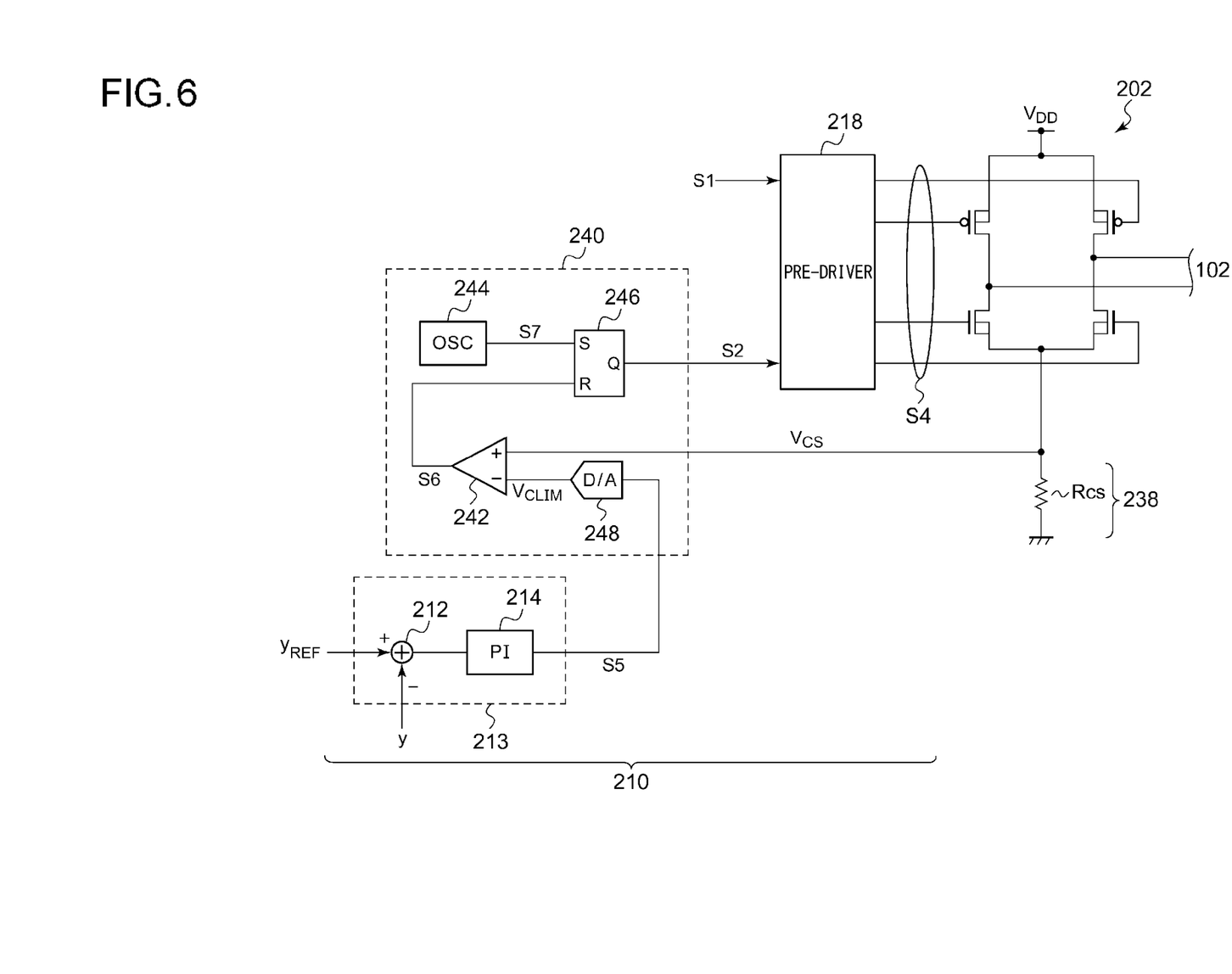
FIG. 6 is a block diagram showing another example configuration of the logic circuit.

FIG. 6 is a block diagram showing another configuration of the logic circuit 210. The logic circuit 210 includes a controller (which will be referred to as the "current value setting unit" hereafter) 213 and a current control circuit 240. It can be understood that the current value setting unit 213 corresponds to the controller 211 shown in FIG. 5, and the current control circuit 240 corresponds to the pulse modulator 216 shown in FIG. 5.

The current detection circuit 238 generates a current detection value $V_{CS}$ which indicates the current that flows through the coils L1 and L2 of the stepping motor 102. For example, the current detection circuit 238 includes a current detection resistor $R_{CS}$ provided between the bridge circuit 202 and the ground line. A voltage drop $V_{CS}$ occurs across the current detection resistor $R_{CS}$ in proportion to the coil current. It should be noted that the current detection circuit 238 further includes an amplifier that amplifies the voltage drop $V_{CS}$ or a dividing circuit that divides the voltage drop $V_{CS}$.

The current value setting unit 213 generates a current value S5 that corresponds to the difference between the load angle detection value y and the load angle target value $y_{REF}$. The current value setting unit 213 may be configured in the same manner as in the controller 211 shown in FIG. 5.

The current control circuit 240 generates the control pulse S2 having a duty ratio that is adjusted such that the current detection value $V_{CS}$ does not exceed the current value S5.

The current control circuit 240 includes a comparator 242, a logic element 246, a D/A converter 248, and an oscillator 244. The D/A converter 248 converts the current value S5 into an analog upper limit voltage $V_{CLIM}$. The comparator 242 compares the detection voltage $V_{CS}$ with the upper limit voltage $V_{CLIM}$. When the detection voltage $V_{CS}$ reaches the upper limit voltage $V_{CLIM}$ the comparator 242 asserts (e.g., sets to high level) a comparison signal S6.

When the comparison signal S6 is asserted, the logic element 246 switches the control pulse S2 to the first level (which is a level that corresponds to a disconnection state of the bridge circuit 202, e.g., low level). Furthermore, the logic element 246 switches the control pulse S2 to the second level (which is a level that corresponds to a connection state of the bridge circuit 202, e.g., high level) for every predetermined switching period $T_{SW}$. The oscillator 244 generates an internal clock S7 having the switching period $T_{SW}$. The logic element 246 may be configured as an RS flip-flop configured such that its set terminal receives the internal clock S7 and its reset terminal receives the comparison signal S6.

The pre-driver 218 generates the driving signal S4 that is used to control the bridge circuit 202 according to the control pulse S2 and the input pulse S1, thereby adjusting electric power supplied to the stepping motor 102.

Figure 7:
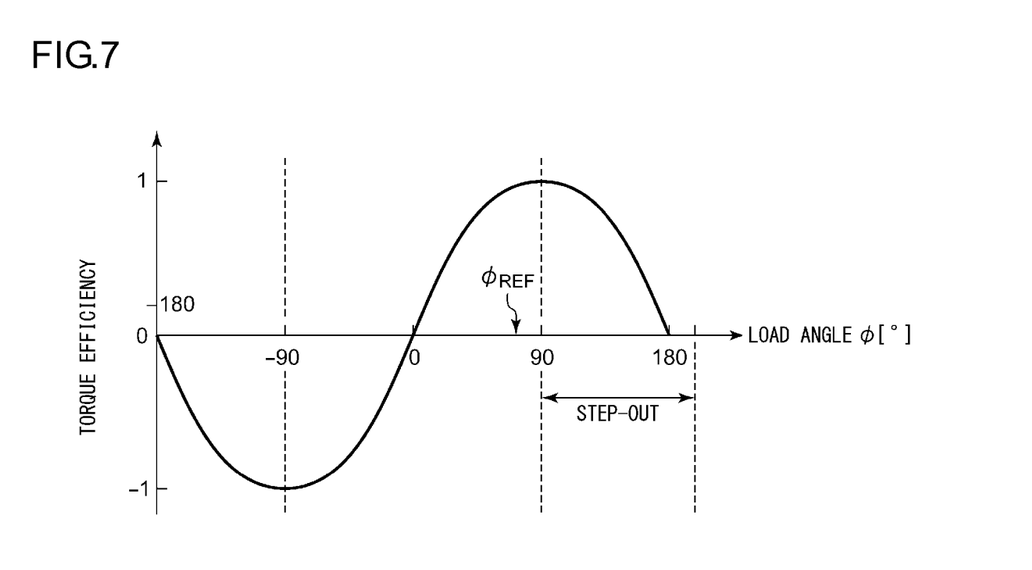
FIG. 7 is a diagram showing the relation between the load angle $\phi$ and the torque efficiency.

FIG. 7 is a diagram showing the relation between the load angle $\phi$ and the torque efficiency. The torque efficiency is represented by the ratio between the output torque TOUT of the motor and the value represented by ($K_T \times I_{OUT}$). Here, $K_T$ represents the torque constant of the motor, and $I_{OUT}$ represents the coil current.

As can be clearly understood from FIG. 7, as the load angle φ becomes closer to 90 degrees, the torque efficiency becomes higher. However, when the load angle φ exceeds 90 degrees, there is a high probability of step-out. Thus, the target value $φ_{REF}$ of the load angle φ is preferably set to a large value in a range that does not exceed 90 degrees. For example, the target angle $φ_{REF}$ may be set to a value in a range of 30 degrees to 60 degrees giving consideration to a margin. More specifically, the target angle $φ_{REF}$ may be set to a value in the vicinity of 45 degrees.

The above is the configuration of the motor driving circuit 200. Next, description will be made regarding the operation thereof.

Figure 8:
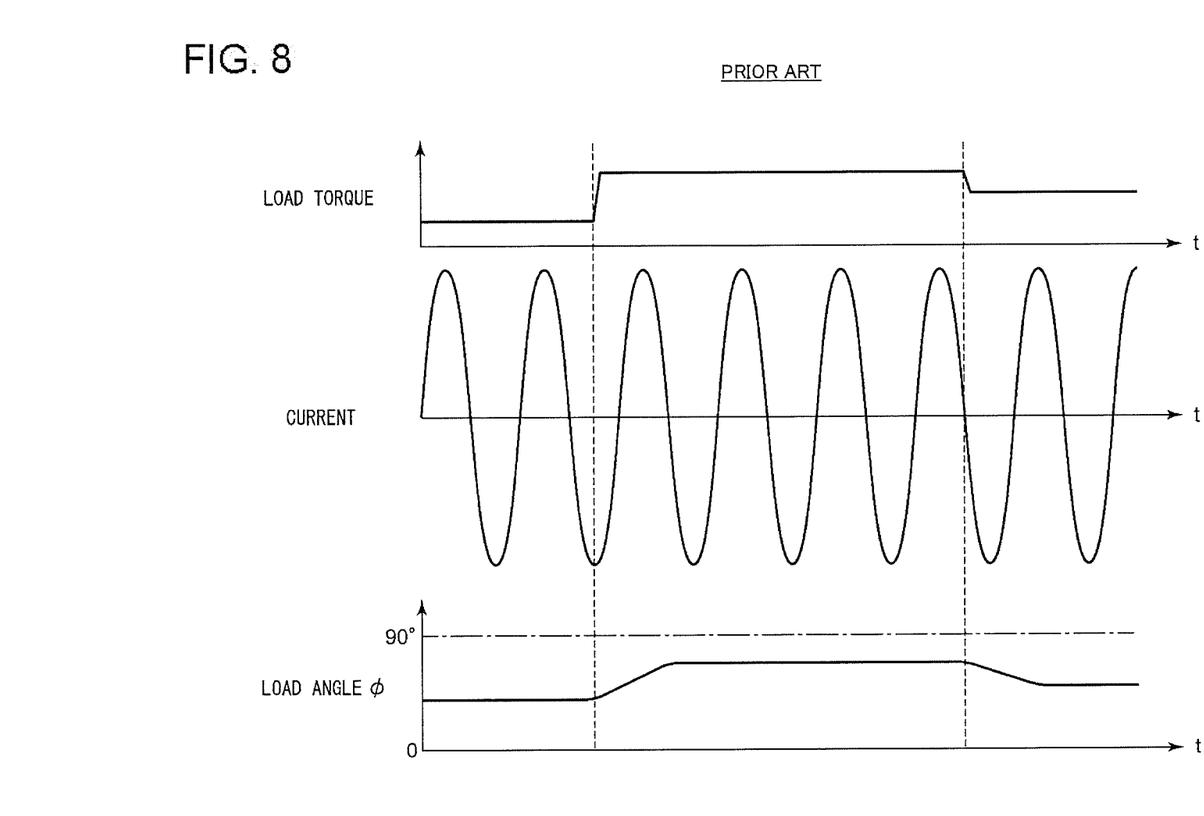
FIG. 8 is an operation waveform diagram showing the operation of a conventional motor driving circuit.
Figure 9:
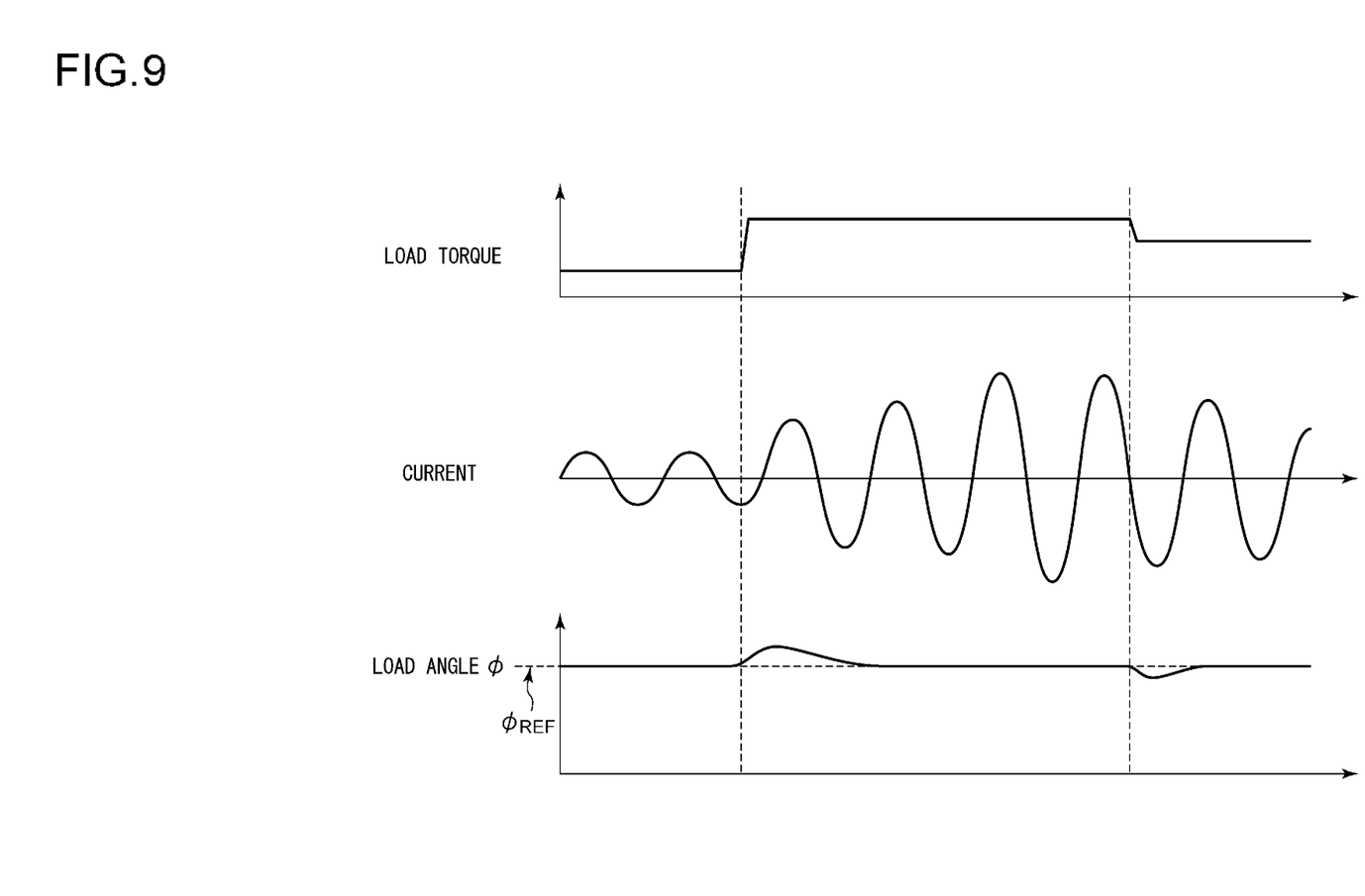
FIG. 9 is an operation waveform diagram showing the operation of the motor driving circuit shown in FIG. 1.

FIG. 8 is an operation waveform diagram showing the operation of a motor driving circuit according to a conventional technique. FIG. 9 is an operation waveform diagram showing the operation of the motor driving circuit 200 shown in FIG. 1. FIGS. 8 and 9 each show the operation in a case in which the load torque is changed at the time points t1 and t2.

In order to further clarify the advantages of the motor driving circuit 200 shown in FIG. 1, first, description will be made with reference to FIG. 8 regarding the operation of the motor driving circuit according to a conventional technique. With such a conventional motor driving circuit, the duty ratio of the output voltage is controlled such that the amplitude of the coil current that flows through the motor is maintained at a constant value, or otherwise such that the amplitude of the coil current that flows through the motor does not exceed a predetermined value. Furthermore, in order to prevent step-out, a margin is set for the assumed maximum load, thereby setting the target value of the coil current so as to obtain an output torque giving consideration to a margin for preventing step-out.

With such a conventional motor driving circuit, the amplitude of the coil current that flows through the motor is maintained at a substantially constant level regardless of the magnitude of the load torque. Accordingly, the load angle φ changes according to a change in the load torque. Thus, when the coil current is raised in order to prevent step-out, the load angle φ is maintained at a small angle. In this state, there is low probability of step-out. However, as a tradeoff disadvantage, this leads to a reduced torque efficiency. Conversely, when the setting value of the coil current is reduced in order to raise the torque efficiency, there is high probability of step-out.

Next, description will be made with reference to FIG. 9 regarding the operation of the motor driving circuit 200 shown in FIG. 1. In the motor driving circuit 200, the logic circuit 210 adjusts the electric power supplied to the coil, and more specifically, adjusts the duty ratio of the switching voltage applied to the coil, such that the estimated load angle φ approaches the predetermined target angle $φ_{REF}$. With such an arrangement, when the load torque becomes large, the amplitude of the coil current is raised. Conversely, when the load torque becomes small, the amplitude of the coil current is reduced.

With the motor driving circuit 200, by suitably selecting the value of the target angle $φ_{REF}$, such an arrangement allows the motor to be rotationally driven with high efficiency while suppressing step-out.

Figure 10A:
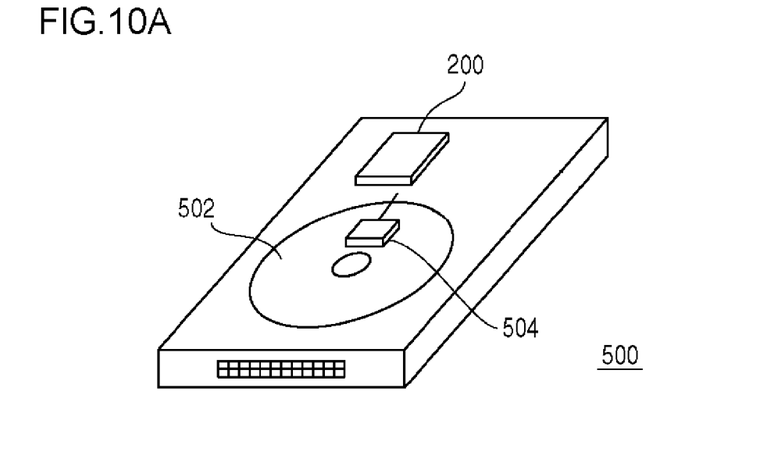
FIGS. 10A through 10C are perspective views each showing an example of an electronic device including the motor driving circuit.
Figure 10B:
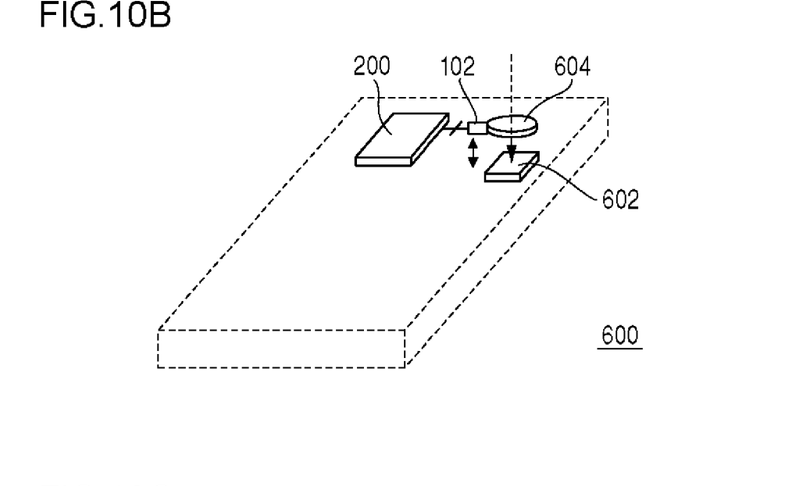
Figure 10C:
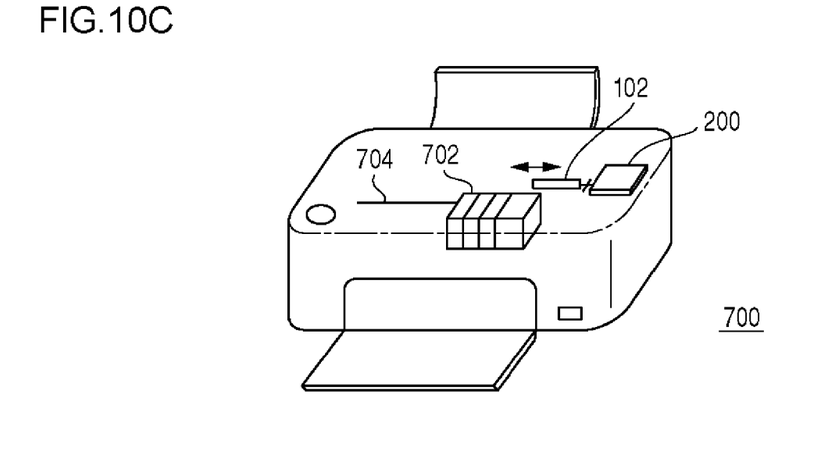

Lastly, description will be made regarding the usage of the motor driving circuit 200. The motor driving circuit 200 is employed in various kinds of electronic devices. FIGS. 10A through 10C are perspective views each showing an example of an electronic device including the motor driving circuit 200.

An electronic device shown in FIG. 10A is configured as an optical disk apparatus 500. The optical disk apparatus 500 includes an optical disk 502 and a pickup head 504. The pickup head 504 is provided so as to allow data to be read from and written to the optical disk 502. The pickup head 504 is configured such that it can be moved over the recording face of the optical disk 502 in the radial direction of the optical disk (tracking). Furthermore, the pickup head 504 is configured such that the distance between it and the optical disk can be adjusted (focusing). The pickup head 504 is positioned by an unshown stepping motor. The motor driving circuit 200 controls the stepping motor. Such a configuration provides high-precision positioning of the pickup head 504 with high efficiency while suppressing step-out.

An electronic device shown in FIG. 10B is configured as a device 600 having an image pickup function such as a digital still camera, a digital video camera, a cellular phone terminal, etc. The device 600 includes an image pickup device 602 and an autofocus lens 604. The stepping motor 102 is used to position of the autofocus lens 604. With such a configuration in which the stepping motor 102 is driven by the motor driving circuit 200, such an arrangement provides high-precision positioning of the autofocus lens 604 with high efficiency while suppressing step-out. In addition to the driving operation for the autofocus lens, such a motor driving circuit 200 may be employed to drive an image stabilization lens. Also, the motor driving circuit 200 may be employed to control an aperture.

An electronic device shown in FIG. 10C is configured as a printer 700. The printer 700 includes a print head 702 and a guide rail 704. The print head 702 is supported so as to provide positioning of the print head 702 along the guide rail 704. The stepping motor 102 controls the position of the print head 702. The motor driving circuit 200 controls the operation of the stepping motor 102. Such a configuration provides high-precision positioning of the print head 702 with high efficiency while suppressing step-out. In addition to the driving operation for driving the print head 702, the motor driving circuit 200 may be employed in order to drive a motor provided for a sheet feeding mechanism.

Description has been made regarding the present invention with reference to the embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

The logic circuit 210 may adjust the power supply voltage $V_{DD}$ supplied to the bridge circuit 202 instead of or otherwise in combination with the adjustment of the duty ratio of the control pulse S2 such that the load angle φ approaches the target angle $φ_{REF}$. By changing the power supply voltage $V_{DD}$, such an arrangement is capable of changing the electric power supplied to the coils L1 and L2 of the stepping motor 102.

Second Modification

The logic circuit 210 is capable of detecting whether or not step-out has occurred, and/or detecting a sign of step-out, based on the load angle φ estimated by the load angle estimation unit 230. For example, the logic circuit 210 may detect a situation in which the estimated load angle φ exceeds 90 degrees or otherwise a situation in which the estimated load angle φ approaches 90 degrees. Also, the logic circuit 210 may output, to an external processor (not shown), a notice signal which indicates the presence or absence of step-out, and/or a sign of step-out, thereby notifying an external circuit of the presence or absence of step-out, and/or a sign of step-out. This allows such an external processor to start a sequence for returning from the step-out state to the normal state.

Modification 3

Description has been made in the embodiment regarding an arrangement in which the output stage of the bridge circuit 10 is configured as a full-bridge circuit. However, the present invention is not restricted to such an arrangement. Also, the output stage may be configured as a half-bridge circuit.

Modification 4

Description has been made in the embodiments regarding an arrangement in which the back electromotive force $V_{BEMF1}$ that occurs at the coil L1 and the back electromotive force $V_{BEMF2}$ that occurs at the coil L2 are monitored so as to detect a sign of step-out. However, the present invention is not restricted to such an arrangement. Also, such an arrangement may monitor the back electromotive force $V_{BEMF1}$ alone or otherwise the back electromotive force $V_{BEMF2}$ alone. Such an arrangement does not require the channel selector 222.

Modification 5

Description has been made in the embodiments regarding an arrangement in which the load angle φ is estimated based on the back electromotive force detected in both of the first high-impedance period Hi-z1 and the second high-impedance period Hi-z2. Also, the load angle φ may be estimated based on the back electromotive force detected in only one of the first high-impedance period Hi-z1 or the second high-impedance period Hi-z2. Similarly, the load angle φ may be estimated based on the back electromotive force $V_{BMF}$ detected in only one of the third high-impedance period Hi-z3 or the fourth high-impedance period Hi-z4.

Modification 6

Description has been made in the embodiments regarding an arrangement in which the detection period is set to a central region of the high-impedance period. However, the present invention is not restricted to such an arrangement.

Also, the predetermined coefficient may be set to a value in the vicinity of ½ to ¾.

Alternatively, the predetermined coefficient may be set to as large a value as possible in a range that does not exceed 1. In this case, the detection period is set to a period immediately before the end of the high-impedance period.

Modification 7

The detection period for detecting the back electromotive force may be set as follows.

1. The period Tp of the input pulse S1 is measured using a clock signal. The detection period may be set to the time point after the time Tp/N elapses after the period transits to the high-impedance period Hi-z. Here, N represents a predetermined integer.

Figure 11:
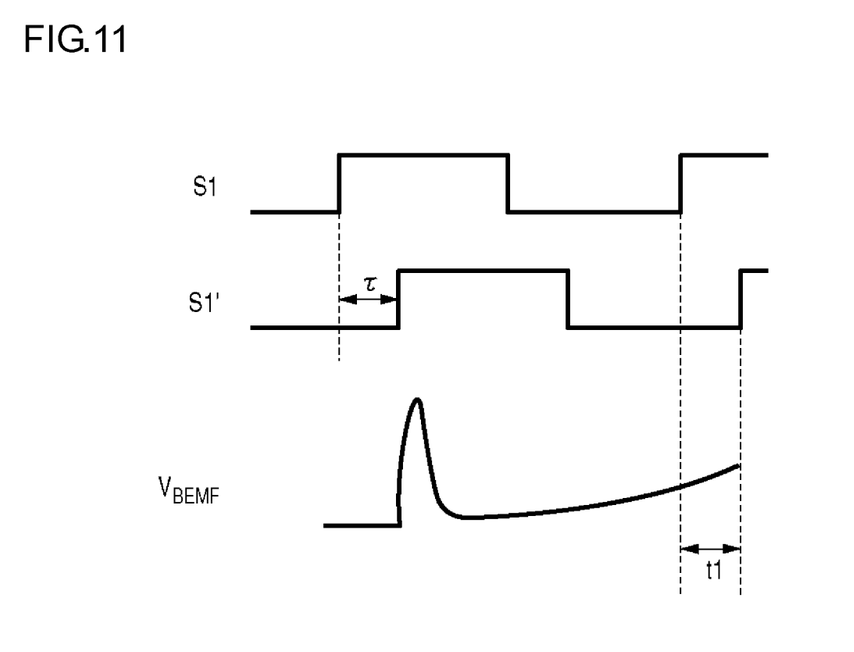
FIG. 11 is a waveform diagram showing an example of a method for setting a detection period.

2. FIG. 11 is a waveform diagram showing an example of a method for setting the detection period. The replica signal S1' is generated by delaying the input pulse S1 by delay time τ. The delay time τ may be configured as a constant value. However, the delay time τ is preferably controlled such that it is proportional to the period of the input pulse S1. Furthermore, the period is switched between the driving period and the high-impedance period in synchronization with the replica signal S1' configured as a step signal. In the high-impedance period Hi-z in which the back electromotive force is to be detected, the period from the edge of the original input pulse S1 (positive edge in this example) up to the edge (positive edge) of the replica signal S1' configured as a step signal may be set to the detection period t1 (t2).

While the preferred embodiments of the present invention have been described using specific terms, such description is for illustrative purposes only, and it is to be understood that changes and variations may be made without departing from the spirit or scope of the appended claims.

What is claimed is:

1. A motor driving circuit for a stepping motor, comprising:
    a logic circuit that controls a bridge circuit connected to a coil of the stepping motor in synchronization with an input pulse, so as to control electric power supplied to the coil of the stepping motor;
    a back electromotive force detector that detects a back electromotive force across the coil; and
    a load angle estimation unit that estimates a load angle based on the back electromotive force detected in a detection period set in a high-impedance period set for the coil,
    wherein the logic circuit is configured to adjust electric power supplied to the coil such that the estimated load angle approaches a predetermined target angle.

2. The motor driving circuit according to claim 1, wherein the load angle estimation unit comprises:
    an A/D converter that converts the back electromotive force into a digital value;
    a period counter that measures a period of the input pulse; and
    a calculator that multiplies the digital value by the period, so as to generate a load angle detection value that corresponds to the load angle,
    and wherein the logic circuit adjusts electric power supplied to the coil such that the load angle detection value approaches a load angle target value that corresponds to the target angle.

3. The motor driving circuit according to claim 2, wherein the logic circuit comprises:
    a controller that generates an instruction value that corresponds to a difference between the load angle detection value and the load angle target value;
    a pulse modulator that generates a control pulse having a duty ratio that corresponds to the instruction value; and
    a pre-driver that controls the bridge circuit according to the control pulse.

4. The motor driving circuit according to claim 2, further comprising a current detection circuit that generates a current detection value that indicates a current that flows through the coil of the stepping motor,
    wherein the logic circuit comprises:

a controller that generates a current value that corresponds to a difference between the load angle detection value and the load angle target value;

a current control circuit that generates a control pulse having a duty ratio that is adjusted such that the current detection value does not exceed the current value; and a pre-driver that controls the bridge circuit according to the control pulse.

5. The motor driving circuit according to claim 4, wherein the current control circuit comprises:

a comparator that compares the current detection value with the current value, and that generates a comparison signal which is asserted when the current detection value exceeds the current value; and a logic element that switches the control pulse to a first level when the comparison signal is asserted, and that switches the control pulse to a second level for every predetermined period.

6. The motor driving circuit according to claim 3, wherein the controller includes a PI controller.

7. The motor driving circuit according to claim 1, wherein the logic circuit pulse-modulates the control pulse for driving the bridge circuit such that the load angle approaches the target angle.

8. The motor driving circuit according to claim 1, wherein the logic circuit adjusts a power supply voltage supplied to the bridge circuit such that the load angle approaches the target angle.

9. The motor driving circuit according to claim 1, wherein the detection period is positioned at an approximately central region of the high-impedance period.

10. The motor driving circuit according to claim 1, wherein the detection period is positioned at a time point after an elapse of time obtained by multiplying a length of the high-impedance period by a predetermined coefficient after a transition to the high-impedance period.

11. The motor driving circuit according to claim 1, monolithically integrated on a single semiconductor substrate.

12. An electronic device comprising:

a stepping motor; and a motor driving circuit for driving the stepping motor comprising:

a logic circuit that controls a bridge circuit connected to a coil of the stepping motor in synchronization with an input pulse, so as to control electric power supplied to the coil of the stepping motor;

a back electromotive force detector that detects a back electromotive force across the coil; and a load angle estimation unit that estimates a load angle based on the back electromotive force detected in a detection period set in a high-impedance period set for the coil, wherein the logic circuit is configured to adjust electric power supplied to the coil such that the estimated load angle approaches a predetermined target angle.

13. A driving method for driving a stepping motor, comprising:

controlling a bridge circuit connected to a coil of the stepping motor in synchronization with an input pulse, so as to control electric power supplied to the coil of the stepping motor;

detecting a back electromotive force across the coil in a detection period set in a high-impedance period set for the coil;

estimating a load angle based on the back electromotive force detected in the detection period;

adjusting electric power supplied to the coil such that the estimated load angle approaches a predetermined target angle.

14. The driving method according to claim 13, wherein the estimating the load angle comprises:

converting the back electromotive force into a digital value;

measuring a period of the input pulse; and multiplying the digital value by the period, so as to generate a detection value that corresponds to the load angle, and wherein the electric power supplied to the coil is adjusted such that the detection value approaches a target value that corresponds to the target angle.

15. The driving method according to claim 14, wherein the adjusting the electric power supplied to the coil comprises pulse modulation of the control pulse for driving the bridge circuit such that the detection value approaches the target angle.

16. The driving method according to claim 14, wherein the adjusting the electric power supplied to the coil comprises adjusting a power supply voltage supplied to the bridge circuit such that the detection value approaches the target angle.

* * * * *